United States Patent [19]

Crew

[11] Patent Number: 4,764,818
[45] Date of Patent: Aug. 16, 1988

[54] ELECTRON BEAM MEMORY SYSTEM WITH IMPROVED HIGH RATE DIGITAL BEAM PULSING SYSTEM

[75] Inventor: Albert V. Crew, Palos Park, Ill.

[73] Assignee: Electron Beam Memories, Palo Alto, Calif.

[21] Appl. No.: 825,649

[22] Filed: Feb. 3, 1986

[51] Int. Cl.$^4$ .............................................. G11B 9/00
[52] U.S. Cl. .................................. 358/347; 369/101; 365/118; 346/158; 315/382
[58] Field of Search ....................... 346/158, 159, 161; 358/335, 347; 369/101; 315/30, 382, 382.1, 383; 365/118

[56] References Cited

U.S. PATENT DOCUMENTS

| | | | |
|---|---|---|---|
| 3,721,962 | 3/1973 | Foster et al. | 365/118 X |
| 3,748,467 | 7/1973 | Suganuma | 250/49.5 |
| 3,919,550 | 11/1975 | Banbury | 250/311 |
| 3,937,959 | 2/1976 | Namae | 250/311 |
| 4,074,313 | 2/1978 | Reisner et al. | 369/101 X |
| 4,090,253 | 5/1978 | Salgo | 365/118 X |
| 4,245,159 | 1/1981 | Beisswenger | 250/396 |

*Primary Examiner*—Robert L. Richardson

[57] ABSTRACT

An electron beam memory system comprises a substrate mounted for rotation and supporting an information storage medium. Means are provided for rotating the substrate. An electron gun comprises a field emission cathode having an emitting tip, anode means, and means for developing and applying between the tip and the anode means a predetermined accelerating potential for forming a high brightness electron source at the tip and for causing an electron beam to be formed through the anode means. The gun includes focus lens means for receiving the beam and for forming a very small yet intense electron beam probe at a predetermined first focal distance therefrom. A high rate digital beam pulsing system comprises voltage pulse generating means for developing a series of voltage pulses of predetermined magnitude and duration, and means for applying the pulses to the gun such that the pulses add to or subtract from the accelerating potential to thereby cause the focus lens means to focus the beam at a predetermined second focal distance different from the first focal distance. The gun is positioned relative to the recording medium such that one of the first and second focal distances corresponds to the distance between the focus lens means and the recording medium.

7 Claims, 2 Drawing Sheets

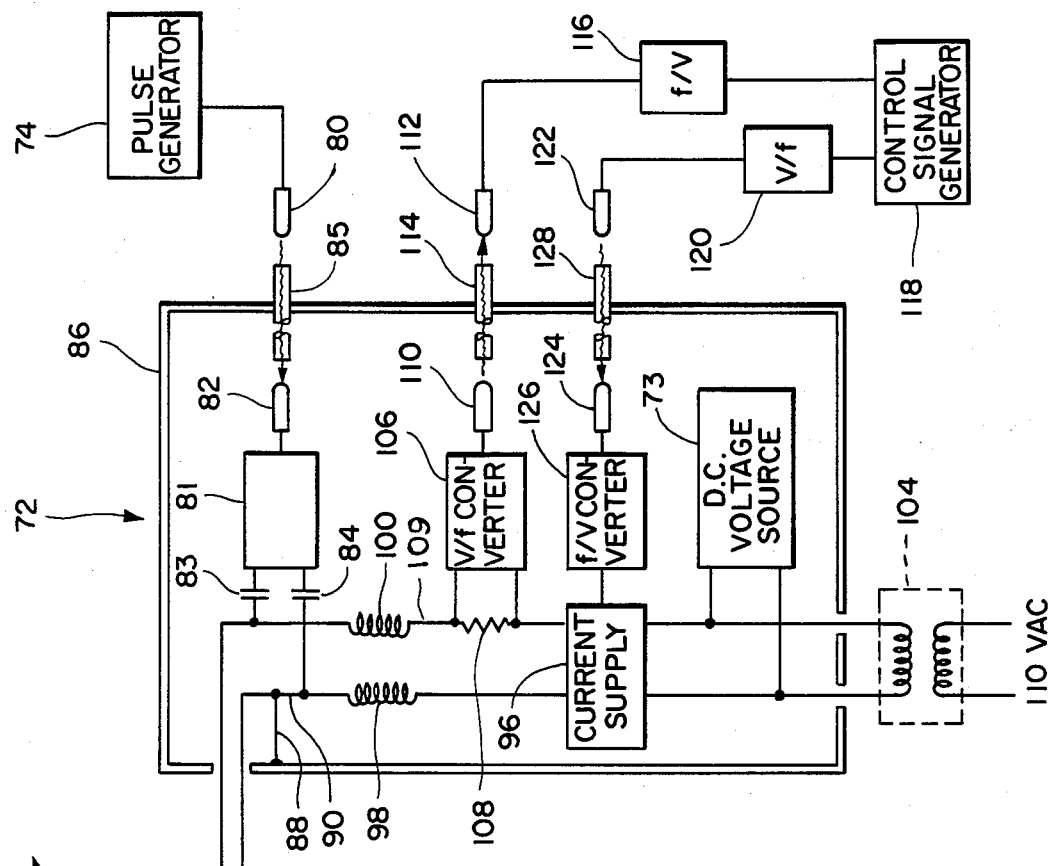
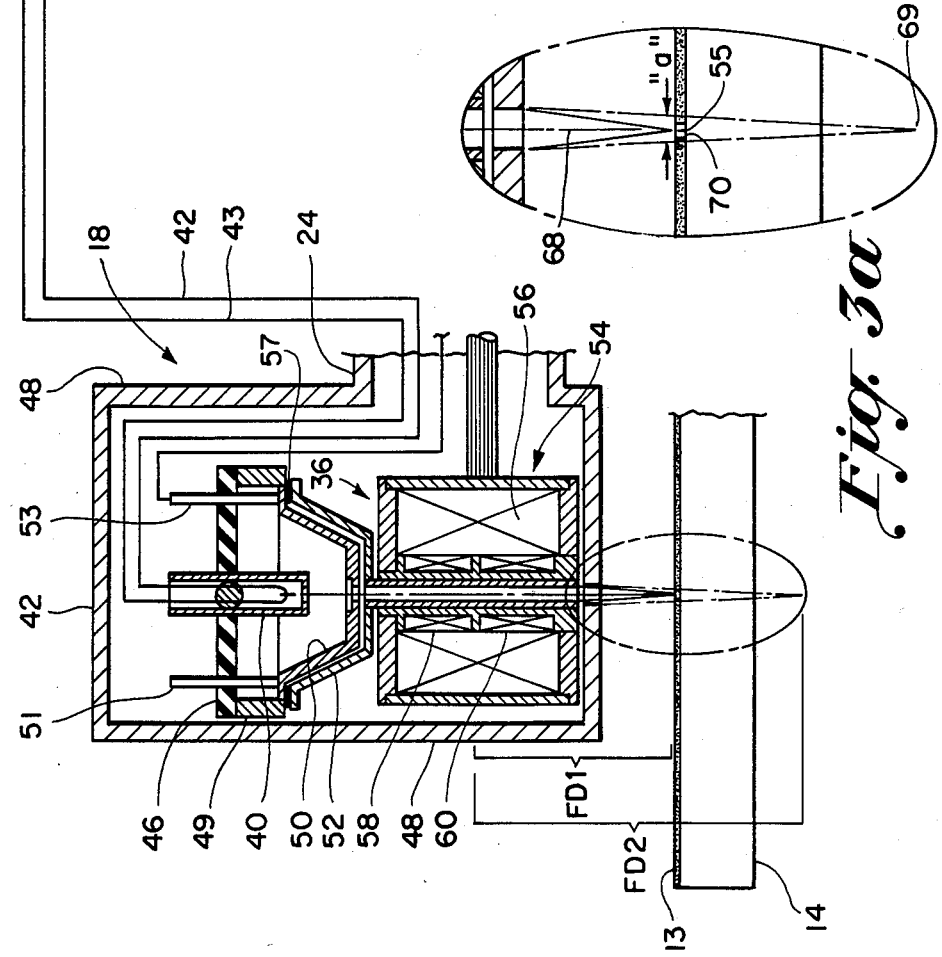
Fig. 3
Fig. 3a

ELECTRON BEAM MEMORY SYSTEM WITH IMPROVED HIGH RATE DIGITAL BEAM PULSING SYSTEM

CROSS REFERENCE TO RELATED APPLICATIONS

This application is related to, but in no way dependent upon, my copending application Ser. No. 825,219, now abandoned.

BACKGROUND OF THE INVENTION

This application concerns an electron beam memory system with improved high rate digital beam pulsing system.

It is a primary object of the invention described and claimed in my copending application Ser. No. 825,219 (now abandoned) to provide an electron beam memory system having an electron gun capable, for the first time, of developing high enough electron probe current densities to permit no-develop recording and small enough probe sizes to permit ultra-high density recording, yet of such low mass and compactness as to make feasible rapid random accessing of any area on the system's recording medium.

In the context of such a system, beam pulsing apparatus is needed which is compatible with and contributes to the achievement of these capabilities in the gun.

Electron beam digital pulsing systems are known which create an intermediate beam cross-over or focus between the source and ultimate probe (focus). A simple deflector is placed at the location of this intermediate focus and a suitable aperture is put into the succeeding lens. When the deflector is activated, the beam strikes the aperture support and is thereby attenuated. The beam, when undeflected, passes through the aperture unattenuated, the ultimate focus being unaffected.

The net result is that the recording beam can be turned off and on (pulsed) without being deflected sideways or becoming distorted. This is an effective way to pulse an electron beam, but requires a second lens—a constraint which all but rules it out as a feasible beam pulsing technique in a system of the type described in which gun compactness and low mass are of critical importance.

It is known in a scanning electron microscope system having a magnetic focus lens to add an auxiliary magnetic lens or an auxiliary winding on a main focus lens, and to apply, when working in a high resolution mode, a current pulse to the auxiliary winding or lens to selectively defocus the electron beam. See U.S. Pat. No. 3,919,500. The described technique is not used to apply pulse information. Rather, the defocused condition of the beam is used to develop a total-beam-current reference which is used to compensate the resultant data for instability in the beam current.

This scanning electron microscope technique would not be suitable for use in the electron beam memory system with which this invention is concerned, as the additional lens or winding would unacceptably add to the mass and bulk of the electron gun. Further, the inductance of the auxiliary lens or winding would unacceptably limit the achievable data recording rate.

U.S. Pat. No. 3,748,467 discloses a scanning electron microscope with an auxiliary lens which is switched between two current levels to create two fixed focal planes, the data gathered from which planes are displayed on separate cathode ray tubes. Again, the technique is not used for pulse information recording and would be similarly unacceptable for that purpose for the same reasons.

An auxiliary magnetic lens of the type called for in the afore-discussed patents is disclosed in U.S. Pat. No. 4,245,159.

U.S. Pat. No. 3,397,959 discloses a scanning electron microscope utilizing an auxiliary focus lens in an automatic focusing system for the microscope.

OBJECTS OF THE INVENTION

It is an object of this invention to provide apparatus for high rate pulsing of an electron beam in an electron beam memory system.

It is another object of this invention to provide such digital beam pulsing apparatus which adds no significant mass or bulk to the electron gun, and which permits very high recording rates.

It is another object to provide such high rate digital beam pulsing apparatus which is useful with a high electron density recording system and is low in manufacturing cost.

It is still another object to provide such high rate digital beam pulsing apparatus which is suitably adapted for use with an electron gun having either magnetic or electrostatic main focus lens means.

It is yet another object to provide in an electron beam memory system having an electron gun with a field emission source, improved apparatus for monitoring the source heater current.

BRIEF DESCRIPTION OF THE DRAWINGS

FIG. 3 is a schematic diagram illustrating the beam pulsing and source heater current monitoring systems according to this invention; and FIG. 3A is an enlargement of a portion of FIG. 3.

DESCRIPTION OF THE PREFERRED EMBODIMENT

Figure 1:
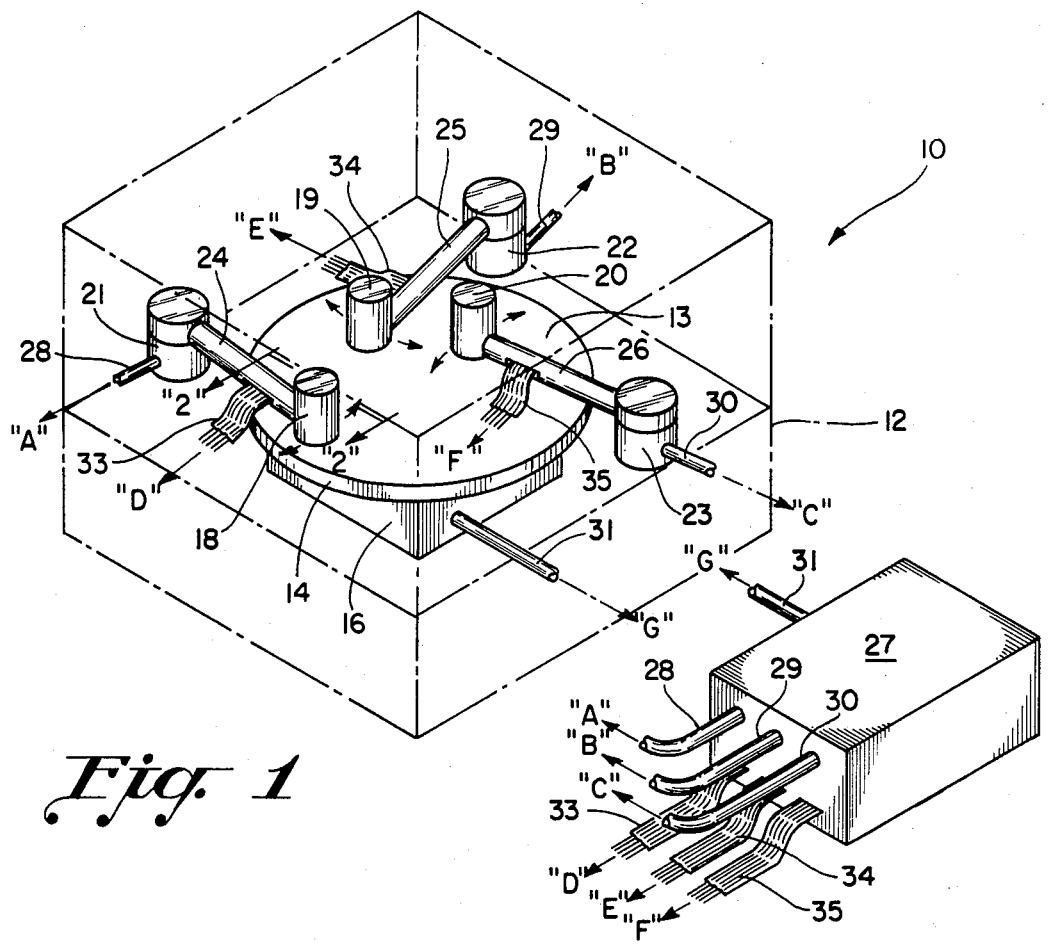
FIG. 1 is a highly schematic illustration of an electron beam memory system incorporating a high rate digital beam pulsing system constructed according to the teachings of the present invention.
Figure 2:
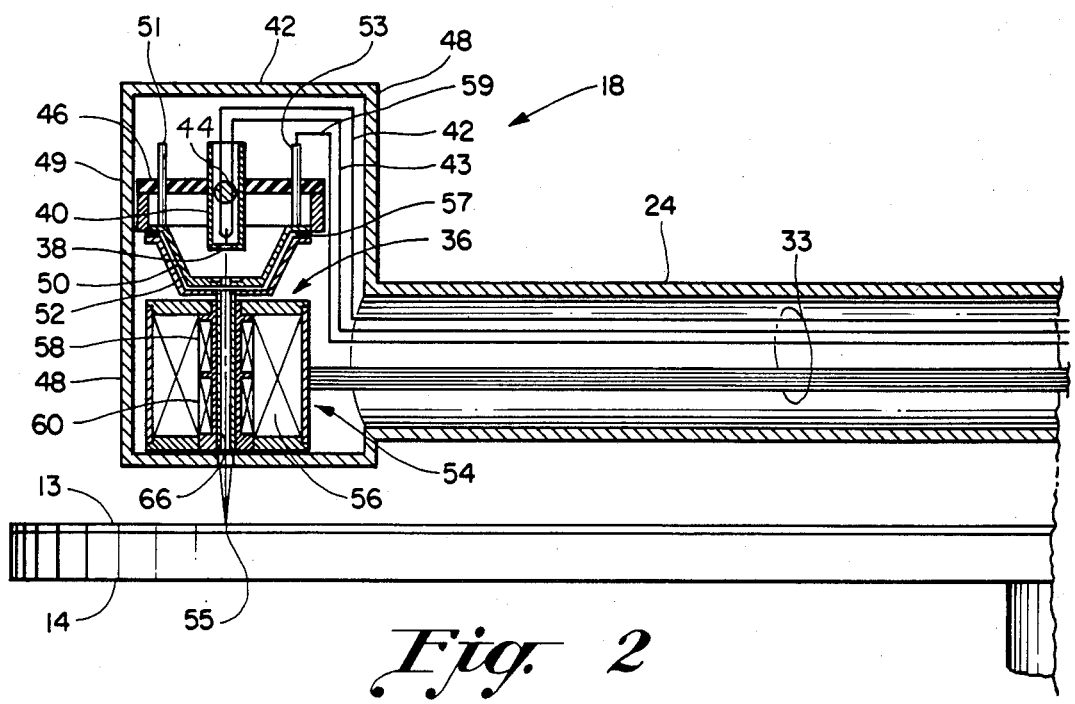
FIG. 2 is a sectional view of a writing head constituting part of the FIG. 1 system.

FIG. 1 is a schematic view of an electron beam memory system 10 embodying the present invention. Before describing in detail the high rate digital beam pulsing and source current monitoring systems according to the present invention, the general aspects of the FIG. 1 electron beam memory system embodying the invention will be discussed. The FIG. 1 system and novel electron gun shown in FIG. 2 are described and claimed in my copending applications identified above. The FIG. 1 system 10 is shown as including a vacuum enclosure, depicted schematically in dotted line form at 12. Within the enclosure is a storage medium 13 supported on a rotatable disc 14. The disc 14 is rotated by a disc drive shown schematically at 16.

In accordance with an aspect of the invention claimed and described in my copending application Ser. No. 825,219 (now abandoned), the electron beam memory system 10 includes a plurality of electron beam heads adapted for simultaneous operation. In the illustrated embodiment, I have shown three heads—a writing head 18 containing an electron gun for assisting in recording information, a verification head 19 containing an electron gun for assisting in verifying the fact and integrity of the stored information, and a reading head 20 containing an electron gun for assisting in retreiving the stored information.

The electron beam memory system 10 is illustrated schematically as including head drives 21, 22, 23 interconnected with the heads 18, 19, 20 by support arms 24, 25, 26 for moving the heads 18, 19, 20 across the disc 14.

Auxiliary electronic and electrical apparatus, shown schematically at 27 provides the necessary drive signals through conductors 28, 29, 30 for energizing head drives 21, 23, 23. Apparatus 27 also supplies through conductor 31 suitable drive currents for the focus lens, heater current for the field emission source heater and energization potentials for the gun electrodes through bundles of conductors 33, 34, 35.

FIG. 2 illustrates a writing electron gun contained within writing head 18. As will be described, the FIG. 2 gun is capable of developing a finely focused electron beam probe at high beam current densities, yet is ultracompact and of extremely low mass. For the first time, the electron gun of my copending application makes possible a truly random accessed electron beam memory system for high rate, ultra-high density electron beam data recording, and yet with recording power making possible no-develop recording, i.e., recording without the need for developing the recording medium after exposure. With such a writing electron gun, a very high capacity electron beam storage medium can be employed using multiple accessory verification and reading heads to permit simultaneous recording and reading over long periods of time—a critically important capability for a great many applications. Because of the vast storage capability of an electron beam memory system such as this, it may be totally impractical in many applications to delay access to the memory until the memory is filled (which could take weeks or months), during which time the stored information is inaccessible.

An electron beam memory system becomes truly universally useful only when it has the capability to record without any development of the medium using a rapid random accessing head and with simultaneously operable pick-up heads for verifying and/or retrieving the stored information as soon as it is recorded.

Before engaging in a detailed discussion of the FIG. 2 electron gun, I will first discuss in general terms the performance requirements imposed on a writing gun of an electron beam memory sytstem of the character described herein. A few of the performance, packaging and other requirements imposed on the gun are, in general terms, as follows: (1) as stated, the gun must be of sufficient compactness and of sufficiently low mass as to be readily capable of being rapidly accelerated and decelerated to effectuate a rapid random accessing of the electron beam memory medium; (2) the gun must be capable of producing an extremely fine probe to permit ultra-high density recording on the medium; (3) the probe produced must not only be extremely fine, but must have high current densities, in order that no-develop recording can be achieved—that is, recording characterized by an alteration of the physical state of the recording medium which can be detected immediately after recording, as by use of an electron beam probe; (4) the gun must be capable of working with relatively low accelerating voltages in order that the beam penetration and spreading is not excessive, and so that the insulation requirements do not drive up the size and mass of the gun; (5) the head must have a modest power consumption in order that massive cooling structures are not required; (6) the gun must have an electron source which not only is extremely bright, but is also stable and of long life in order that the system in practice is easy to use by operators of ordinary skill; and (7) the gun must have a commercially tolerable cost of manufacture.

The simplest way to effect an irreversible change in the physical state of the recording medium is to induce melting or boiling of the recording material to create a depression or pit in the medium. The pit can be detected, for example, with a less-intense electron beam probe and accompanying means for detecting secondary, back-scattered or transmitted electrons.

The melting temperature "Tm" of a material can be approximated by the relation $$TM = \frac{3IV}{2\pi Ka},$$

where "I" is the electron beam current in amperes, "V" is the beam voltage in volts, "K" is the thermal conductivity of the material in calories per centimeter squared per second, and "a" is the radius of the heated zone in the recording medium in centimeters.

Using bismuth as the recording medium, for example, having "K"=0.02 and "Tm"=270 degrees centigrade, and assuming a beam voltage "V" of 5 kilovolts and a heated zone "a" of 0.08 microns, then "I"=160 nanoamperes. In this example, a current "I" of 160 nanoamperes and a heated zone "a" of 0.08 microns establishes a current density threshold above which the melting point of the bismuth recording medium is exceeded and "no-develop" recording can be achieved. In the present invention, as will be described in more detail below, digital recording is achieved by the use of a pulsed recording signal to create "pits" or "no-pits", signifying binary "1's" or "0's" (or "0's" and "1's") in the recording medium.

Recording rates are limited by the rate at which the medium can be heated:

$$\gamma = \frac{\rho a \alpha^2}{K},$$

where $\alpha$ is the specific heat and $\rho$ is the density of the material. The recording rates for most materials and the probe diameters of interest is in the order of $10^{-8}$ to $10^{-10}$ seconds, allowing recording rates of 100 megahertz and above.

In terms of beam power requirements, for beams having current values in the range of 100–500 nanoamperes with accelerating voltages of 3–5 kilovolts, for example, the beam power is in the range of 300–500 microwatts. This is more than adequate power to produce melting in materials of interests such as bismuth, tellurium, arsenides of such materials and mixtures thereof, for example, which require only a few microwatts of power to be melted, using probes with a diameter of .1 micron or less.

A detailed discussion of the FIG. 2 electron gun will now be engaged. In order to achieve the high current densities required for high rate, no-develop recording, a heated field emission cathode is employed.

In FIG. 2, the field emission source tip is shown at 38. A tip can is shown at 40 and heater leads at 42, 43. Silica ball 44 supports the heater in can 40. The tip may be operated at vacuum levels of $10^{-9}$ to $10^{-10}$ torr, for example. Source currents up to 1,000 microamperes can be produced. Emission noise levels for these operating parameters are in the order of a few percent.

An insulator 46 supports the tip assembly comprising the can 40 and tip 38 and isolates it electrically from the other parts of the gun and the gun enclosure 48. The insulator 46 is, in turn, supported by a support element 49.

In order to draw electrons from the tip, the FIG. 2 gun includes a truncated conical accelerating anode electrode 50 which is spaced from a beam tube assembly 52 by an insulating ring 57. Electrically conductive hold-down pins 51, 53 hold such electrode 50 against ring 57. Appropriate electrical potential is applied to electrode 50 through lead 59.

A focus lens 54 has a single lens coil 56 and is positioned a relatively short object distance from the tip 38 for receiving a beam of electrons from the anode electrode 50. The focus lens 54 forms a finely focused electron beam probe 55 (the beam focus) on the medium 10 at a relatively short focal distance therefrom. In accordance with an aspect of the invention described and claimed in my copending application Ser. No. 825,219 (now abandoned), the sum of the object and image distances are so small as to suppress the space charge contribution to probe diameter and thereby to make feasible electron beam probes with diameters as small as a few hundred angstroms.

Located within the compass of the coil 56 are interwound stigmator coils 58 for reducing to an acceptable level any astigmatism which may be present in the electron beam. Axially separated from the stigmator coils 58 are a pair of interwound deflection coils 62 for deflecting the electron beam in orthogonal directions across the medium 13. Gross positioning of the electron beam probe 55 is by movement of the head 18 across the storage medium 13. Fine positioning of the electron beam probe 55 on the storage medium 13 is accomplished by appropriate selection of driving currents for the deflection coils 62.

A beam tube 66 extends from the anode electrode 50 to the point of beam exit from the gun 36.

An electron beam memory system according to my copending application Ser. No. 825,219 (now abandoned) must necessarily be very small with a total overall length from source tip 38 to probe of no greater than about 5 centimeters. The operating voltage of the electron gun will be in the range of about 3 to 10 Kv, the probe size will be in the range of 100–500 Å with a probe current in the range of 100–500 nA. This will allow a writing speed of 100 MHz or more. The electron gun preferably has a total mass of no more than about 200 grams. The electron gun 36 is extraordinarily compact; by way of illustration, the total length of the gun is no more than about 4 centimeters. A gun having such extreme compactness and low mass can be quickly moved to any part of the recording medium in order to effectuate rapid random accessing of any selected area on the medium for the purpose of adding information to any selected file or area on the medium.

Important aspects of the present invention will now be described. In general terms this invention concerns an electron beam memory system which includes a substrate mounted for rotation and supporting an information storage medium. Means are provided for rotating the substrate. An electron gun and means for effecting relative movement between the gun and the substrate are provided. The electron gun in the system of the present invention comprises a cathode, anode means and means for developing and applying between the cathode and the anode means a predetermined accelerating potential for forming a high brightness electron source and for causing an electron beam to be formed through the anode means. A focus lens is provided for receiving the beam and for forming a small yet intense electron beam probe at a predetermined first focal distance from the lens means. A high rate digital beam pulsing system is provided which includes voltage pulse generating means for developing a series of voltage pulses of predetermined magnitude and duration. Means are provided for applying the pulses to the gun such that the pulses add to or subtract from the accelerating potential thereby cuasing the focus lens to focus the beam at a predetermined second focal distance differing from the first focal distance. The gun is positioned relative to the recording medium such that one of the first and second focal distances corresponds to the distance between the focus lens and the recording medium.

As noted, this invention is adapted for use in a rapid random accessed electron beam memory system with a no-develop recording medium—in particular, a medium such as bismuth or other material having a relatively low thermal conductivity. Such media can be melted or evaporated by the application of a relatively modest level of electron beam energy. The temperature rise in such recording media is proportional to the bombarding electron current level and inversely proportional to the radius of the bombarding electron beam probe. The beam pulsing sytem of the present invention causes a rapid change in the temperature of the localized areas on a recording medium by effecting rapid changes in the cross-sectional area of the electron beam which intercepts the medium. This change in beam intercept area is accomplished by altering the focal distance of the focus lens.

As noted, this invention is most suitable for use with an electron gun having a field emission source. It is a characteristic of a field emission gun that the energy of the electrons drawn from the field emission tip is determined by the accelerating voltage applied between the anode electrode and the tip. If the accelerating voltage is adjusted between first and second levels, the focal distance of the lens will change correspondingly between first and second focal distances. For an accelerating voltage of a few thousand volts, a small change in the order of 10 to 20 volts will effect a significant change in the focal distance of the focus lens and thus in the intercept area of the beam on the medium 13.

As noted, in accordance with this invention, voltage pulses are applied to the gun such as to add to or subtract from the accelerating potential and thus create the aforesaid two levels of accelerating potential and two different focal distances. Applying pulses corresponding to digital information to be recorded, the focal distance can be changed at high recording rates. If the recording medium is located at one of the two focal distances, the probe will be in focus on the medium for one pulse level and out of focus at the other pulse level.

In accordance with this invention, a recording medium is selected which has a melting characteristic which is such that when the medium is bombarded by an electron beam having a current density exceeding a predetermined melting threshold, melting of the medium occurs. The said current density of the electron beam and the magnitude of the voltage pulses are caused to be such that when the beam is focused on the medium, the melting threshold of the medium is exceeded and melting of the medium occurs, but when the beam is focused at the other of the focal distances and is thus out of focus with respect to the medium, the threshold is not reached and melting of the medium does not occur.

It is highly desirable in a practical electron beam memory system, due to the immense amount of information to be stored, that digital recording be effective at very high rates—for example, in the order of 100 megahertz. That requirement implies that capacitance in the system applying the voltage pulses be minimized.

It is another aspect of this invention to provide in a digital beam pulsing system of the character described means for applying the aforesaid voltage pulses in additive (or subtractive) relationship to the field emission gun's accelerating potential in such a way that the pulse generating apparatus can be maintained at ground potential or some other relatively low potential, and thus can be manufactured at relatively lower cost than if such apparatus were maintained at accelerating potential.

It is still another aspect of this invention to provide a high rate digital beam pulsing system which is relatively low in cost. In field emission guns the stability of the heater current must be extreme. This requires that the heater current be carefully monitored and controlled. The cost of field emission guns has been high due in part to the need for monitoring and control equipment which, in the past, has been maintained at the accelerating potential of the gun—typically in kilovolts or even tens of kilovolts. As will be explained in detail below, in accordance with an aspect of this invention, only the current supply, a current sensor, and certain other minor elements are maintained at the accelerating potential, the heater current stabilizing system being maintained at ground or other relatively low potential.

FIG. 3 (including the FIG. 3A blow-up) illustrates in detail the high rate digital beam pulsing system of this invention. In FIG. 3 the electron gun 36 is shown as developing an electron beam 68 focused to form a probe 55 on the recording medium 13 at a focal distance FD1 (focal distance 1). The beam 68 is shown in dotted lines in a second state corresponding to application of an accelerating potential at a greater level. In the second state the probe 69 is focused at a second focal distance, designated FD2 in FIG. 3.

In accordance with this invention, there is applied to the electron gun, in such a way as to add to or subtract from the gun's accelerating potential, a series of voltage pulses characterizing the digital information to be recorded. This series of pulses causes the focal distance of the focal lens 54 to vary between focal distance FD1 and focal distance FD2 at the digital information recording (pulse) rate.

When the beam is focused at focal distance FD1, that is with the probe in focus on the medium 13, the electron beam has a current density which exceeds a predetermined melting threshold of the medium and a pit or hole 70 is formed in medium 13. Conversely, when the voltage pulse is at its alternate elevated state, the energy of the electrons in the electron beam is increased and the probe is focused at focal distance FD2 with the result that the area of intercept or impingement of electron beam 68 expands to have a radius "a" (FIG. 3) which is sufficiently greater than the radius of probe 55 that the melting threshold of the medium is not reached and melting of the medium does not occur—that is, no pit or hole is formed in the medium when the beam is focused at focal distance FD2.

The high rate digital beam pulsing system of this invention will now be described in more detail. In FIG. 3 there is shown a high voltage supply depicted schematically at 72. Acceleration voltage is applied to the field emission tip 38 by a D.C. voltage source 73. A first series of voltage pulses corresponding to the digital information to be recorded is generated at ground or a relatively low potential in pulse generating apparatus shown schematically at 74. The voltage pulses are of predetermined magnitude necessary to effecutate the appropriate change in the focal distance of the gun's focus lens 54.

The first series of pulses developed in the pulse generating apparatus 74 are applied to an opto-isolator link. The opto-isolator link comprises voltage-to-lightwave transduction means, here shown as a light emitting diode 80, responsive to the first series of voltage pulses from the pulse generating apparatus 74 for converting the pulses to corresponding lightwave signals. Lightwave-to-voltage transduction means, here shown as a photodiode 82, is maintained at the relatively high acceleration potential and is optically coupled to the light emitting diode 80 for developing a second series of voltage pulses corresponding to the lightwave signal. The voltage pulses developed at the output of photodiode 82 are applied to a voltage pulse generator 81 which shapes the pulses received from photodiode 82 and applies them to tip 38 through a pair of blocking capacitors 84, 83.

The optical coupling may be direct, but in the preferred embodiment is through an optical fiber 85. In accordance with an aspect of this invention, by the use of the optoisolating link, the first series of voltage pulses are generated in the pulse generating apparatus 74 at ground or some other relatively low potential, thus saving the cost of developing the pulses at the accelerating potential. Thus the first and second series of voltage pulses, at relatively low and relatively high potentials, respectively, are developed in isolation from each other.

In order to reduce the capacity in the pulse-applying circuit, the high voltage supply 72 preferably has its housing 86 maintained at the relatively high negative accelerating potential of tip 38 by means of conductor 88. Conductor 88 is shown schematically as being connected between tip heater lead 90 and housing 86. Thus with the tip 38 and the housing 86 for the high voltage supply 72 being maintained at the same relatively high negative accelerating potentials, the capacity between the tip 38 and the housing 86 is diminished, permitting a much faster recording rate due to the reduced capacitive reactance in the pulse-applying circuit.

In the illustrated FIG. 3 embodiment, current is supplied to the field emission tip 38 by a current supply 96 which is maintained at accelerating potential. A pair of inductors 98, 100 protect the current supply 96 from the pulses applied through capacitors 83, 84 to the tip 38. A 110 volt A.C. input to the system is isolated from the high voltage supply 72 by an isolation transformer 104.

By way of example, the potential developed by the D.C. voltage source may be, for example, in the range of 3–10 kilovolts. The magnitude of the voltage pulses applied to tip 38 may be in the order of 10–20 volts, for example.

As noted above, in a field emission gun for use in an electron beam memory system of the character described, it is of extreme importance that the heater current developed for heating the tip be extremely stable. According to an aspect of this invention there is provided a low cost system for stabilizing the source heater current for a field emission gun. The system involves current level monitoring means for developing an electrical signal representative of the level of the heater current. In the preferred FIG. 3 embodiment, the level monitoring means is shown as taking the form of a voltage-to-frequency converter 106 connected across a resistor 108 in heater current wire 109. Voltage-to-lightwave transduction means, here shown in the form of an LED (light emitting diode) 110, is responsive to a variable pulse frequency signal developed in the voltage-to-frequency converter 106. The LED 110 generates lightwave pulses whose frequency corresponds to the voltage developed across resistor 108.

Lightwave-to-voltage transduction means, here shown in the form of a photodiode 112, is optically coupled to the LED 110 for developing a pulsed voltage output signal whose frequency corresponds to the frequency of the optical signal developed by the LED 110. The photodiode 112 may directly receive light emitted by the LED 110, or, as shown, may be optically coupled thereto by an optical fiber 114. A frequency-to-voltage converter 116 responsive to the output of photodiode 112 develops an output signal indicative of the level of the heater current.

Means are provided for developing a heater current control signal for stabilizing the current supply 96. In the illustrated preferred embodiment, said means is shown as taking the form of a control signal generator 118. Generator 118 is responsive to the output of frequency-to-voltage converter 116 and develops a control signal effective to counteract any fluctuations in the heater current. The generator 118 may be a simple comparator which compares the output of the converter 116 to a predetermined reference and generates a control signal the magnitude and polarity of which indicate the magnitude and polarity of the heater current deviations from a predetermined reference.

The control signal is supplied to a voltage-to-frequency converter 120 which is, in turn, coupled to a voltage-to-lightwave transduction means, here shown as an LED 122. The LED 122 develops a lightwave signal indicating in frequency the magnitude and polarity of the control signal developed in the generator 118. Lightwave-to-voltage transduction means, here shown in the form of a photodiode 124, is responsive to the lightwave signal. The photodiode 124 is coupled to frequency-to-voltage converter 126. The photodiode may respond directly to lightwave developed by the LED 122, or as shown, may receive the lightwaves through an optical fiber 126.

The frequency-to-voltage converter 126 develops a control signal corresponding to the lightwave signal received by the photodiode 124 and applies it through a lead 130 to the current supply 96.

The sub-system comprising converter 120, LED 122, fiber 126, photodiode 124 and converter 126 function very similar to the sub-system comprising converter 106, LED 110, fiber 114, photodiode 112 and converter 116. The effect of the heater current stabilizing system is to produce a stabilizing signal which stabilizes the heater current for the tip 38.

In accordance with an objective of this invention, the control signal generator 118 is maintained at ground or other relatively low potential, while only the voltage-to-frequency and frequency-to-voltage converters 120, 126, LED 110 and photodiode 124 need be maintained at the relatively high acceleration potential. Thus, the circuitry used to develop the control signal is developed in electrical isolation from the current supply and other circuitry existing at accelerating potential. The result is a system which is extremely effective, yet relatively low in cost compared with prior systems in which the entire heater current monitoring and stabilizing system are maintained at the accelerating potential.

By using lightwave-to-voltage and voltage-to-lightwave transduction means in which pulsed lightwaves are developed whose frequency represents the transmitted information, it can be seen that any attenuation of the lightwaves or other amplitude-related errors introduced in the optical links do not introduce errors in the control signal. The prospect of significant frequency perterbations being introduced in the optical link are insignificant by comparison with amplitude-related errors which could be introduced.

The above embodiment is merely illustrative and it is contemplated that other structures may be employed to implement the teachings of the present invention. The following claims are intended to cover such other structures.

What is claimed is:

1. An electron beam memory system comprising:
   a substrate mounted for rotation and supporting an information storage medium;
   means for rotating said substrate;
   an electron gun and means for effecting relative movement between said gun and said substrate, said electron gun comprising:
   a field emission cathode having an emitting tip,
   anode means,
   means for developing and applying between said tip and said anode means a predetermined accelerating potential for forming a high brightness electron source at said tip and for causing an electron beam to be formed through said anode means, and
   focus lens means for receiving said beam and for forming a very small yet intense electron beam probe at a predetermined first focal distance therefrom; and
   a high rate digital beam pulsing system comprising:
   voltage pulse generating means for developing a series of voltage pulses of predetermined magnitude and duration, and
   means for applying said pulses to said gun such that said pulses add to or subtract from said accelerating potential to thereby cause said focus lens means to focus said beam at a predetermined second focal distance different from said first focal distance, said gun being positioned relative to said recording medium such that one of said first and second focal distances corresponds to the distance between said focus lens means and said recording medium.

2. An electron beam memory system comprising:
   a substrate mounted for rotation and supporting an information storage medium, said medium having a melting characteristic which is such that when said medium is bombarded by an electron beam having a current density exceeding a predetermined melting threshold, melting of the medium occurs;

means for rotating said substrate;
an electron gun and means for effecting relative movement between said gun and said substrate, said electron gun comprising:
a field emission cathode having an emitting tip,
anode means,
means for developing and applying between said tip and said anode means a predetermined accelerating potential for forming a high brightness electron source at said tip and for causing an electron beam to be formed through said anode means, and
focus lens means for receiving said beam and for forming a very small yet intense electron beam probe at a predetermined first focal distance therefrom; and
a high rate digital beam pulsing system comprising:
voltage pulse generating means for developing a series of voltage pulses of predetermined magnitude and duration, and
means for applying said pulses to said gun such that said pulses add to or subtract from said accelerating potential to thereby cause said focus lens means to focus said beam at a predetermined second focal distance different from said first focal distance, said gun being positioned relative to said recording medium such that one of said first and second focal distances corresponds to the distance between said focus lens means and said recording medium,
the said current density of said electron beam and the said magnitude of said voltage pulses being such that when said beam is focused on said medium, said melting threshold is exceeded and melting of said medium occurs, but when said beam is focused at the other of said focal distances and is thus out of focus with respect to said medium, said threshold is not reached and melting of said medium does not occur.

3. An electron beam memory system comprising:
a substrate mounted for rotation and supporting an information storage medium, said medium having a melting characteristic which is such that when said medium is bombarded by an electron beam having a current density exceeding a predetermined melting threshold, melting of the medium occurs;
means for rotating said substrate;
an electron gun and means for effecting relative movement between said gun and said substrate, said electron gun comprising:
a field emission cathode having an emitting tip,
anode means,
high voltage supply means for developing and applying to said tip a predetermined accelerating potential which is negative relative to said anode medium for forming a high brightness electron source at said tip and for causing an electron beam to be formed through said anode means, said supply means having an electrically conductive housing,
means for applying said negative accelerating potential to said supply housing, and
focus lens means for receiving said beam and for forming a very small yet intense electron beam probe at a predetermined first focal distance therefrom; and
a high rate digital beam pulsing system comprising:
voltage pulse generating means for developing a series of voltage pulses of predetermined magnitude and duration, and
means for applying said pulses to said gun such that said pulses add to or subtract from said accelerating potential to thereby cause said focus lens means to focus said beam at a predetermined second focal distance different from said first focal distance, said gun being positioned relative to said recording medium such that one of said first and second focal distances corresponds to the distance between said focus lens means and said recording medium,
the said current density of said electron beam and the said magnitude of said voltage pulses being such that when said beam is focused on said medium, said melting threshold is exceeded and melting of said medium occurs, but when said beam is focused at the other of said focal distances and is thus out of focus with respect to said medium, said threshold is not reached and melting of said medium does not occur,
the application of said negative accelerating potential to both said tip and said supply housing reducing the capacity therebetwen and thus making possible a faster pulse rate.

4. An electron beam memory system comprising:
a substrate mounted for rotation and supporting an information storage medium;
means for rotating said substrate;
an electron gun and means for effecting relative movement between said gun and said substrate, said electron gun comprising:
a field emission cathode having an emitting tip,
anode means,
means for developing and applying between said tip and said anode means a predetermined relatively high accelerating potential for forming a high brightness electron source at said tip and for causing an electron beam to be formed through said anode means, and
focus lens means for receiving said beam and for forming a very small yet intense electron beam probe at a predetermined first focal distance therefrom; and
a high rate digital beam pulsing system comprising:
voltage pulse generating means at a relatively low potential for developing a first series of pulses of predetermined magnitude and duration, and
pulse-applying means for applying said first series of pulses to said gun such that said pulses add to or subtract from said accelerating potential to thereby cause said focus lens means to focus said beam at a predetermined second focal distance different from said first focal distance, said gun being positioned relative to said recording medium such that one of said first and second focal distances corresponds to the distance between said focus lens and said recording medium,
said pulse-applying means including voltage-to-lightwave transduction means at said relatively low potential responsive to said first series of pulses for converting said pulses to a corresponding lightwave signal, and lightwave-to-voltage transduction means at said relatively high potential and optically coupled to said voltage-to-lightwave transduction means for developing a second series of voltage pulses corresponding to said lightwave signal, whereby said first series of pulses are developed at said relatively low potential in electrical isolation from said accelerating potential.

5. An electron beam memory system comprising:
a substrate mounted for rotation and supporting an information storage medium, said medium having a melting characteristic which is such that when said medium is bombarded by an electron beam having a current density exceeding a predetermined melting threshold, melting of the medium occurs;
means for rotating said substrate;
an electron gun and means for effecting relative movement between said gun and said substrate, said electron gun comprising:
a field emission cathode having an emitting tip, anode means,
high voltage supply means for developing and applying to said tip a predetermined relatively high accelerating potential which is negative relative to said anode means for forming a high brightness electron source at said tip and means for causing an electron beam to be formed through said anode means, said supply means having an electrically conductive housing,
means for applying said negative accelerating potential to said supply housing, and
focus lens means for receiving said beam and for forming a very small yet intense electron beam probe at a predetermined first focal distance therefrom; and
a high rate digital beam pulsing system comprising:
voltage pulse generating means at a relatively low potential for developing a first series of pulses of predetermined magnitude and duration, and
pulse-applying means for applying said first series of pulses to said gun such that said pulses add to or subtract from said accelerating potential to thereby cause said focus lens means to focus said beam at a predetermined second focal distance, said gun being positioned relative to said recording medium such that one of said first and second focal distances corresponds to the distance between said focal lens means and said recording medium,
the said current density of said electron beam and the said magnitude of said voltage pulses being such that when said beam is focused on said medium, said melting threshold is exceeded and melting of said medium occurs, but when said beam is focused at the other of said focal distances and is thus out of focus with respect to said medium, said threshold is not reached and melting of said medium does not occur,
the application of said negative accelerating potential to both said tip and said supply housing reducing the capacity therebetween and thus making possible a faster pulse rate,
said pulse-applying means including voltage-to-lightwave transduction means at said relatively low potential responsive to said first series of pulses for converting said pulses to a corresponding lightwave signal, and lightwave-to-voltage transduction means at said relatively high potential but optically coupled to said voltage-to-lightwave transduction means for developing a second series of voltage pulses corresponding to said lightwave signal, whereby said first series of pulses are developed at said relatively low potential in electrical isolation from said accelerating potential.

6. An electron beam memory system comprising:
a substrate mounted for rotation and supporting an information storage medium;
means for rotating said substrate;
an electron gun and means for effecting relative movement between said gun and said substrate, said electron gun comprising:
a field emission cathode having an emitting tip, anode means,
means for developing and applying to said tip a predetermined relatively high negative accelerating potential for forming a high brightness electron source at said tip and for causing an electron beam to be formed through said anode means, and
focus lens means for receiving said beam and for forming a very small yet intense electron beam probe in the vicinity of said storage medium;
a tip heater current source for developing and supplying a heater current for heating said tip;
means for applying said accelerating potential to said current source;
current level monitoring means for developing an electrical signal representative of the level of said heater current, including voltage-to-lightwave transduction means at said relatively high potential and responsive to said heater current for developing a lightwave signal representing the level of said heater current and lightwave-to-voltage transduction means at a relatively low potential and optically coupled to said voltage-to-lightwave transduction means for developing a current-responsive signal corresponding to said optical signal, whereby said current-representative signal is developed at said relatively low potential in electrical isolation from said heater current source at said accelerating potential.

7. An electron beam memory system comprising:
a substrate mounted for rotation and supporting an information storage medium;
means for rotating said substance;
an electron gun and means for effecting relative movement between said gun and said substrate, said electron gun comprising:
a field emission cathode having an emitting tip, anode means,
means for developing and applying to said tip a predetermined relatively high negative accelerating potential for forming a high brightness electron source at said tip and for causing an electron beam to be formed through said anode means, and
focus lens means for receiving said beam and for forming a very small yet intense electron beam probe in the vicinity of said storage medium;
a tip heater current source for developing and supplying a heater current for heating said tip;
means for applying said accelerating potential to said current source;
current level monitoring means for developing an electrical signal representative of the level of said heater current, including voltage-to-lightwave transduction means at said relatively high potential and responsive to said heater current for developing a periodically fluctuating lightwave signal whose frequency represents the level of said heater current and lightwave-to-voltage transduction means at a relatively low potential and optically coupled to said voltage-to-lightwave transduction means for developing a heater-current-representative signal corresponding to said optical signal;

means for developing a heater current stabilizing signal comprising:

control signal generating means at said relatively low potential and responsive to said heater-current-representative signal for developing a current supply control signal, voltage-to-lightwave transduction means at said relatively low potential and responsive to said stabilizing signal for developing a periodically fluctuating lightwave signal whose frequency represents said control signal, and lightwave-to-voltage transduction means at said relatively high potential and optically coupled to said voltage-to-lightwave transduction means for developing a heater-current-stabilizing signal corresponding to said lightwave signal, and means for applying said stabilizing signal to said tip heater current source for stabilizing said source, whereby said control signal is developed at said relatively low potential in electrical isolation from said heater current source at said relatively high potential.

* * * * *